United States Patent [19]

Reed

[11] 4,399,603
[45] Aug. 23, 1983

[54] POWER GRIP TOOL EXCHANGE ARM FOR MACHINING CENTER

[75] Inventor: Robert E. Reed, Kaukauna, Wis.

[73] Assignee: Giddings & Lewis, Inc., Fond du Lac, Wis.

[21] Appl. No.: 207,664

[22] Filed: Nov. 17, 1980

[51] Int. Cl.³ .......................................... B23Q 3/157
[52] U.S. Cl. .................................. 29/568; 74/813 L; 294/103 R
[58] Field of Search ............................ 29/568, 26 A; 294/102 A, 103 R; 74/813 L

[56] References Cited

U.S. PATENT DOCUMENTS

| | | | |
|---|---|---|---|
| 2,433,127 | 12/1947 | Kinzbach | 279/77 |
| 2,653,502 | 9/1953 | Meyer et al. | 82/2.5 |
| 2,685,823 | 10/1954 | Kaiser | 90/11 |
| 2,925,016 | 2/1960 | Walter et al. | 90/11 |
| 3,052,011 | 9/1962 | Brainard et al. | 29/26 |
| 3,073,024 | 1/1963 | Hutchens et al. | 29/568 |
| 3,161,951 | 12/1964 | Anthony | 29/568 |
| 3,217,406 | 11/1965 | Dever | 29/568 |
| 3,259,976 | 7/1966 | Bergstrom et al. | 29/568 |
| 3,277,569 | 10/1966 | Verhoeven | 29/568 |
| 3,286,344 | 11/1966 | Brainard et al. | 29/568 |
| 3,300,856 | 1/1967 | Daugherty | 29/568 |
| 3,355,798 | 12/1967 | Drechsler | 29/568 |
| 3,412,459 | 11/1968 | Hollis | 29/568 |
| 3,477,121 | 11/1969 | Martin | 29/568 |
| 3,516,149 | 6/1970 | Mickas | 29/568 |
| 3,571,912 | 3/1971 | Kielma | 29/568 |
| 3,587,873 | 6/1971 | Lohneis | 214/1 BD |
| 3,647,090 | 3/1972 | Suzuki et al. | 214/1 BB |
| 3,667,114 | 6/1972 | Smith et al. | 29/568 |
| 3,691,655 | 9/1972 | Kurimoto et al. | 29/568 |
| 3,704,510 | 12/1972 | Sedgwick et al. | 29/568 |
| 3,886,652 | 6/1975 | Roubloff et al. | 29/568 |
| 3,932,924 | 1/1976 | Anderson | 29/426 |
| 3,947,951 | 4/1976 | Jerue | 29/568 |
| 4,065,988 | 1/1978 | Lohneis et al. | 29/568 X |
| 4,126,233 | 11/1978 | Jeske | 214/1 BB |
| 4,190,947 | 3/1980 | Sato et al. | 29/568 |
| 4,196,506 | 4/1980 | Reed | 29/568 |

FOREIGN PATENT DOCUMENTS

719852 10/1965 Canada .

Primary Examiner—Z. R. Bilinsky
Attorney, Agent, or Firm—Leydig, Voit, Osann, Mayer & Holt, Ltd.

[57] ABSTRACT

An improved tool exchange arm for use in the automatic tool changer of a machining center adapted for boring, drilling, milling, tapping and tool changing operations under numerical control. The tool exchange arm may be incorporated in machining centers of either vertical or horizontal spindle configuration. It operates with current commercial tapered shank toolholders, is capable of precisely and securely positioning itself for engagement with the toolholders to be exchanged, and rotates quickly for tool exchange without sharp impacts at the extremities of its rotational stroke.

14 Claims, 13 Drawing Figures

POWER GRIP TOOL EXCHANGE ARM FOR MACHINING CENTER

DESCRIPTION OF THE INVENTION

The present invention relates to machine tools generally and, more specifically, to an improved tool exchange arm for a multifunction machine tool known as a machining center. Such machines are capable of performing a variety of machining operations such as boring, drilling, milling, and tapping under numerical control. They are usually provided, as in this case, with automatic tool changer capability which also operates under numerical control.

This invention is an improvement over the invention disclosed and claimed in prior U.S. Pat. No. 4,196,506 of Robert E. Reed, issued Apr. 8, 1980, and U.S. application Ser. No. 142,625 of James Nelson, filed Apr. 22, 1980.

The general aim of the present invention is to provide an improved tool exchange arm for use in the automatic tool changer of a machining center which may be of either vertical or horizontal spindle configuration.

A more specific object of the invention is to provide a power grip tool exchange arm for the automatic tool changer of a machining center of the foregoing type and which will be capable of precisely and securely positioning itself for engagement with the toolholders to be exchanged.

Another object is to provide a power grip tool exchange arm for an automatic tool changer of the character set forth above adapted to rotate quickly for tool exchange without creating sharp impacts at the extremities of its rotational stroke.

Another object of the invention is to provide a power grip tool exchange arm for an automatic tool changer of the above type adapted to operate efficiently with tapered shank toolholders of current commercial type.

Other objects and advantages of the invention will become apparent from the following detailed description, taken with the accompanying drawings, wherein.

While the invention is susceptible of various modifications and alternative constructions, certain illustrative embodiments have been shown in the drawings and will be described below in considerable detail. It should be understood, however, that there is no intention to limit the invention to the specific forms described but, on the contrary, the intention is to cover all modifications, alternative constructions, and equivalents falling within the scope of the appended claims.

GENERAL ORGANIZATION—VERTICAL SPINDLE EMBODIMENT

Figure 1:
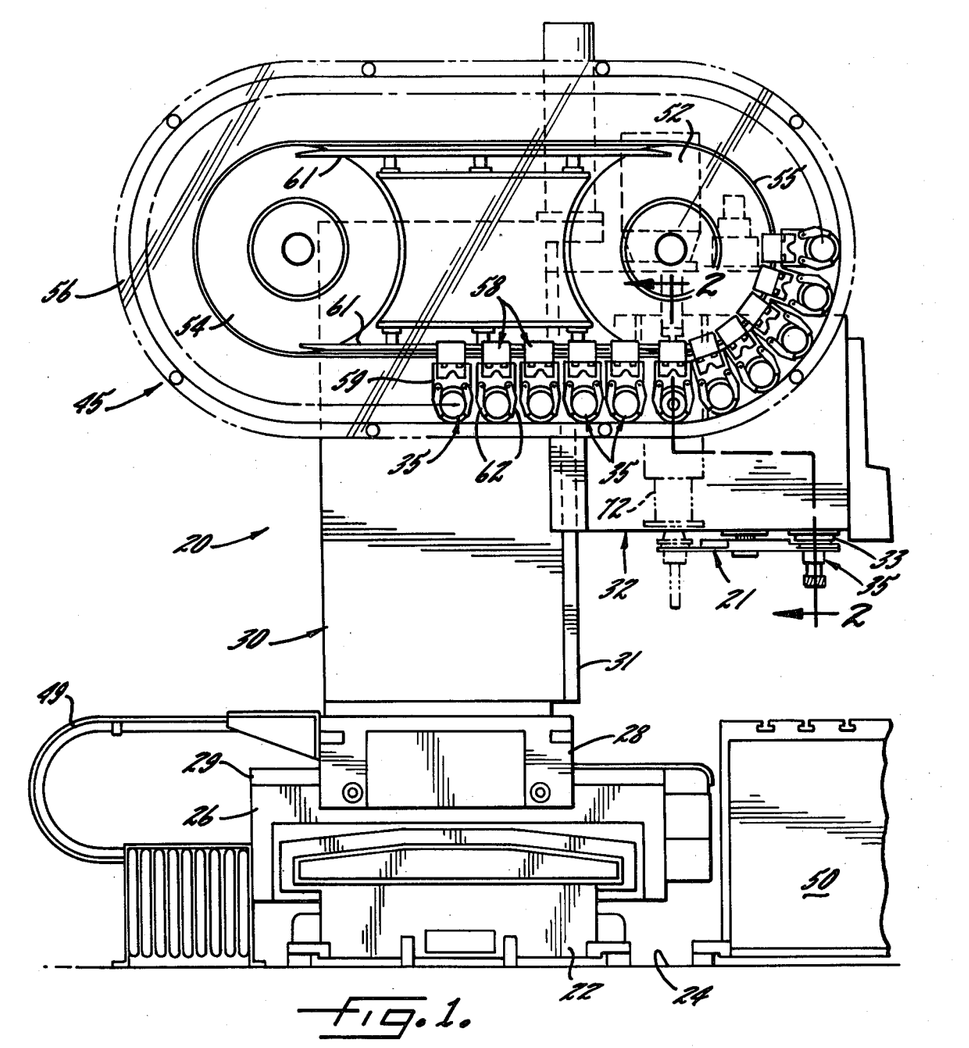
FIG. 1 is a side elevational view of an illustrative vertical spindle machining center having a tool exchange arm exemplifying the present invention.
Figure 2:
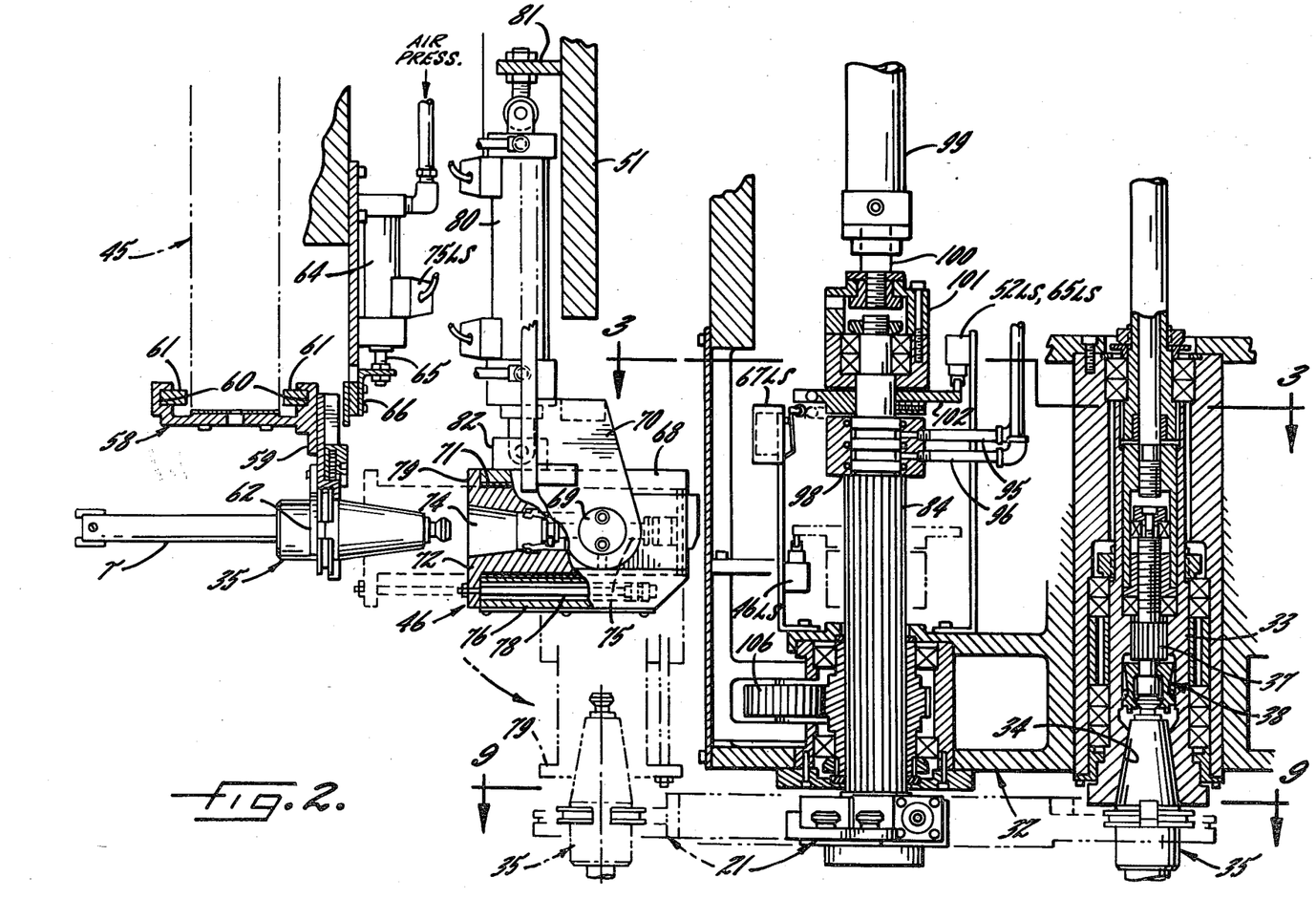
FIG. 2 is an enlarged, broken vertical sectional view through the headstock and tool storage matrix of the illustrative machine, taken in the plane of the line 2—2 in FIG. 1.

Referring more specifically to FIGS. 1 and 2, the invention is there exemplified in an illustrative machining center 20 which incorporates an automatic tool changer having a tool exchange arm 21. The machining center 20 is a vertical power spindle unit and in this instance happens to be a floor type machine. It is adapted to perform boring, drilling, milling and tapping operations, as well as automatic tool changing, all under numerical control.

The machining center 20 utilizes a horizontal base or runway 22 supported on a suitable foundation 24. It includes a saddle 26 supported on antifriction rollers and ways (not shown) on the runway 22 for translational movement longitudinally of the runway, and a cross slide 28 translatably supported by antifriction rollers (not shown) and ways 29 on the saddle for movement along an axis perpendicular to the longitudinal axis of the runway. A column 30 is fixed in upstanding relation on the cross slide 28 and is formed with vertical ways 31 which support a vertically translatable headstock 32.

The headstock 32 has a verically disposed power driven tool spindle 33 journaled therein on the usual antifriction bearings. The spindle 33 is fashioned with an appropriately tapered socket 34 for receiving and engaging the tapered shanks of the current commercial toolholders used for machining operations.

Figure 1A:
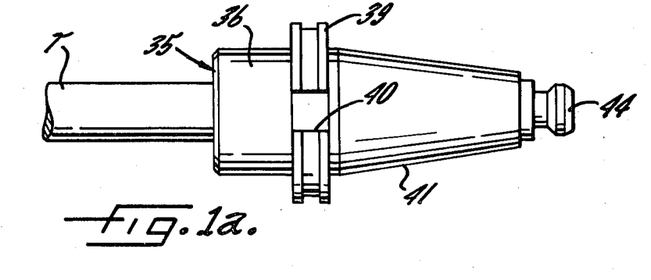
FIG. 1a is an elevational view of an exemplary tapered shank toolholder of the type with which the exchange arm is adapted to operate.

A typical toolholder 35 used in the machining center 20 is illustrated in FIG. 1a. The toolholder 35 comprises a body 36 in which a cutting tool T is securely clamped, and a peripheral gripping flange 39 having a pair of diametrically opposed drive keyways 40. It further includes a precision tapered shank 41 adapted to fit into the mating socket 34 in the spindle 33, and a tapered knob 44 adapted to be engaged by the drawfingers of a power drawbolt. In this instance, the spindle 33 happens to have a rotatably actuated power drawbolt 37 which utilizes a heavy duty power drawfinger system 38.

The automatic tool changer of the machining center 20 comprises a tool storage matrix 45 mounted on the column, a swing spindle assembly 46 mounted on the matrix, and two-handed tool exchange arm 21 mounted on the headstock. The exchange arm 21 is adapted to move axially in a direction parallel to the rotational axis of the spindle 33 and to rotate in planes perpendicular to the axis of the spindle. Its function is to transfer tools between the swing spindle assembly 46 and the power driven spindle 33.

Service lines for electric power and control, hydraulic power, and air are led to the machining center 20 by means of a flexible tray unit 49 connected to the cross slide 28.

A work table 50 is mounted in front of the machining center 20 and is formed with a number of T-slots for securing a workpiece thereto. The work table may be of the fixed type or of the rotary type. The latter may include an indexable platen adapted to present several sides of the workpiece to the cutting tools so as to minimize set-up time.

CAROUSEL TOOL STORAGE MATRIX

The tool storage matrix 45 (FIGS. 1 and 2) is of the carousel type and in this instance contains 40 toolholders with their associated cutting tools. It comprises a matrix support bracket 51 which may be a large plate type weldment bolted or otherwise rigidly fixed to the machine column 30. The matrix support bracket 51 has journaled thereon a pair of drums 52, 54 disposed for rotation about horizontal axes in a common vertical plane spaced outwardly from the side of the column. An endless flexible carrier, such as an alloy steel band 55, is trained around the drums for movement in unison therewith. Its outboard side is protected by means of a transparent shield 56 mounted in spaced relation with the support bracket 51. The matrix is driven as by means of a hydraulic motor connected to either one of the drums.

A plurality of tool platens 58 are fixed in longitudinally spaced relation to the flexible band and each carries a suitable tool gripper mechanism 59 adapted to engage the gripping flange 39 of a toolholder. The toolholder is maintained in an angular oriented condition by means of a key fixed to the gripper mechanism and which engages the keyway 40 of the gripping flange. To provide support for the horizontal reaches of the flexible carrier band 55 between the matrix drums, the tool platens 58 are formed with opposed grooves 60 which slidably engage respective pairs of horizontal guide rails 61 fixed to the matrix support bracket between the drums.

Each of the tool gripper mechanisms 59 (FIGS. 1 and 2) comprises a pair of gripper fingers 62 pivoted to a backing plate and adapted to engage the toolholder body 36. The gripper fingers 62 are resiliently biased toward their engaged position wherein they grip the toolholder body.

For the purpose of releasing the tool gripper fingers of a tool platen located at the transfer station during a tool change cycle to permit transfer of the toolholder 35 from the mechanism 58 to the swing spindle 46, an air actuator 64 is provided. The latter is fixed in any suitable manner to the matrix support bracket structure and has a piston rod 65 depending downwardly therefrom. A release latch 66 secured to the lower depending end of the actuator piston rod 65 is adapted to overcome the biasing means and release the tool gripper fingers 62 on its downward stroke. Conversely, withdrawal of the piston rod 65 upwardly permits the biasing means to resume control, causing the gripper fingers to engage the toolholder.

SWING SPINDLE ASSEMBLY—VERTICAL

The swing spindle assembly 46 (FIGS. 2, 10) is interposed between the tool storage matrix 45 and the two-handed tool exchange arm 21 for the purpose of transferring tools between those components with speed and reliability. The assembly 46 thus comprises a swing spindle housing 68 pivotally mounted on a pair of trunnions 69 fixed to a generally U-shaped support bracket 70. The latter is rigidly connected in any suitable manner to the matrix support bracket 51. The housing 68 is formed with a large central bore which in this instance is provided with an anti-friction liner sleeve 71 extending from the region of the trunnions to the open end of the bore.

Figure 10:
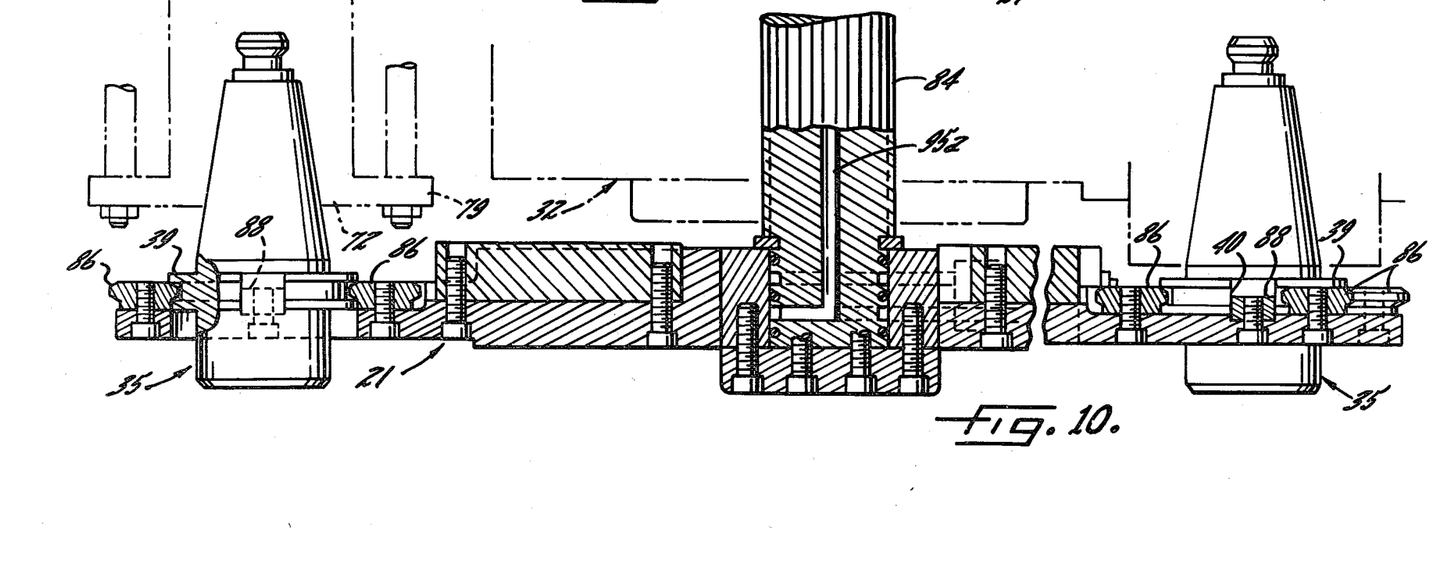
FIG. 10 is a broken vertical sectional view taken through the tool exchange arm in the plane of the line 10—10 in FIG. 9.

A swing spindle 72 is telescopically housed within the housing 68 and its liner sleeve 71. The swing spindle 72 is of hollow cylindrical form with a tapered socket 74 situated in its outer end portion for receiving the tapered shank of a toolholder 35. The inner end portion of the socket 74 houses a hydraulically actuated power drawbolt 75 and its drawfinger assembly. The latter is adapted to engage the tapered knob 44 on the tool shank when pulled axially toward the smaller end of the socket.

The swing spindle 72 is movable axially on the order of 3.805 inches axially in a direction perpendicular to the trunnion pivot axis to facilitate withdrawal of a toolholder 35 from the matrix as well as return of a toolholder to the matrix. This is accomplished in the present instance by means of a pair of hydraulic actuators 76 built into the swing spindle housing 68. The actuators 76 are connected to the swing spindle 72 by their respective piston rods 78 which are fastened to a large flange 79 at the outer end of the swing spindle. The axial movement of the swing spindle relative to the housing 68 is controlled by the hydraulic system associated with the machine and appropriate limit switches.

The swing spindle 72 is adapted to swing through an arc of 90 degrees from the solid outline position indicated in FIG. 2 to the dot-dash position indicated in FIGS. 1 and 10, or vice-versa, to transport a toolholder between the tool storage matrix 45 and the tool exchange arm 21. This is accomplished by means of hydraulic actuator 80 which is pivotally connected at its upper end to a hanger 81 fixed to the matrix support bracket 51, and at its lower end to a clevis 82 fixed to the swing spindle housing 68. The actuator 80 is provided with limit switches situated adjacent its upper and lower ends, respectively, and which are connected to the hydraulic control system of the machine.

Prior to swinging through 90 degrees, the swing spindle 72 is first moved axially to engage a toolholder in the matrix. This initial motion may be approximately 3.43 inches so as to telescope over the greater portion of the tool shank until the tapered knob 44 accosts the end of the power drawbolt with the drawfingers disengaged. Engagement of the power drawbolt will then effect snug engagement of the tool shank with the socket 74. After the gripper mechanism 59 of the matrix is opened by the actuator 64 and its associated release latch 66, the swing spindle is moved an additional 0.375 inches by the actuators 76. The entire swing spindle 72 and housing 68 may then be swung downwardly through a 90 degree arc to the dot-dash position shown in FIG. 2. At this point, the toolholder 35 is ready for engagement by the tool exchange arm 21.

TOOL EXCHANGE ARM

The tool exchange arm 21, as indicated above, is of the two-handed type and is supported by a shaft 84 which depends from the lower face of the headstock (FIGS. 1–3, 8 and 10). The arm 21 is adapted to move in a vertical direction parallel to the axis of the power driven spindle 33 and to rotate in planes perpendicular to the axis of the spindle 33.

Figures 3, 4:
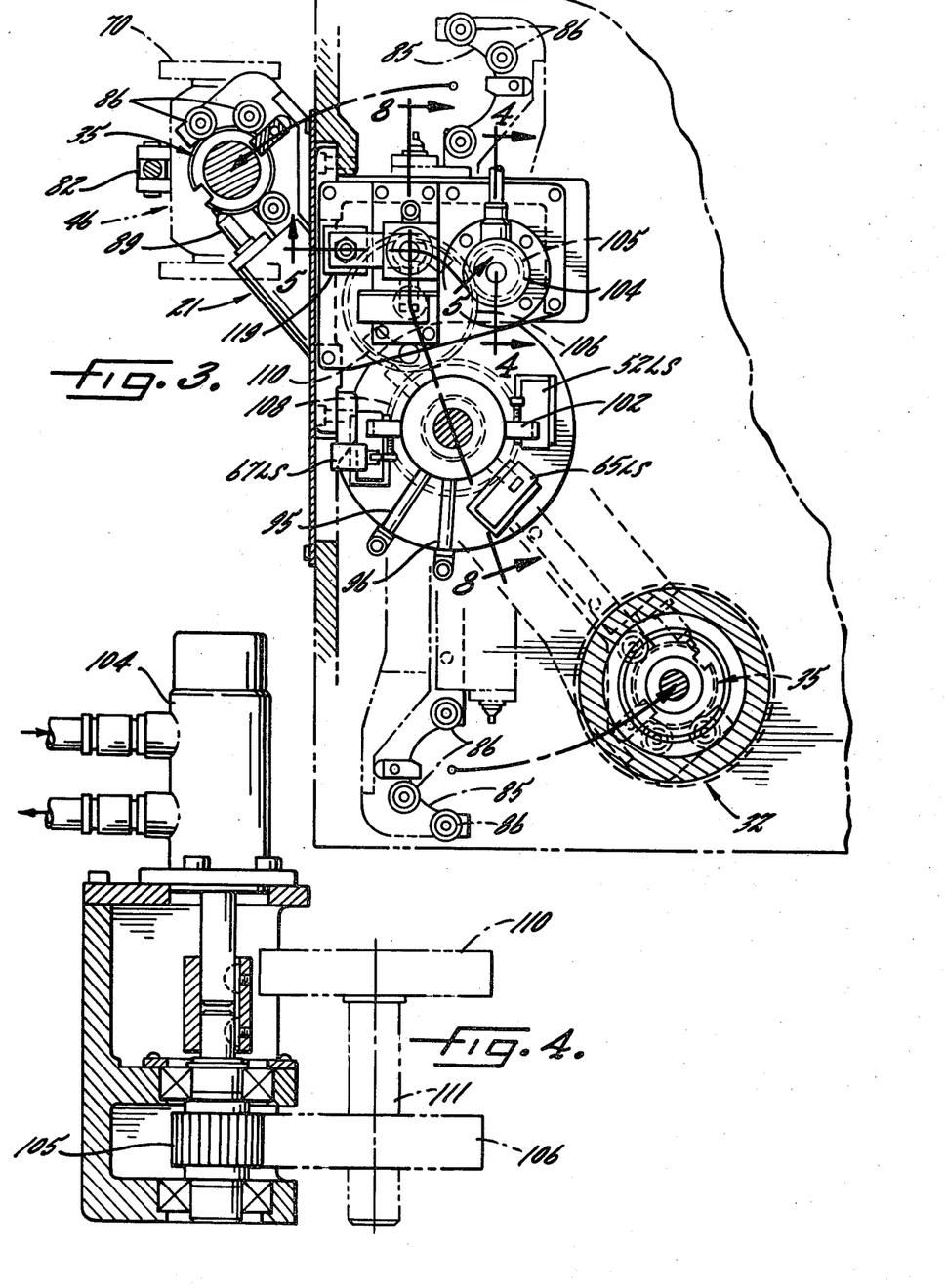
FIG. 3 is a fragmentary horizontal sectional view through a portion of the headstock, taken in the plane of the line 3—3 in FIG. 2.
FIG. 4 is a fragmentary vertical sectional view detailing a portion of the drive for rotating the tool exchange arm, taken in the plane of the line 4—4 in FIG. 3.
Figure 9:
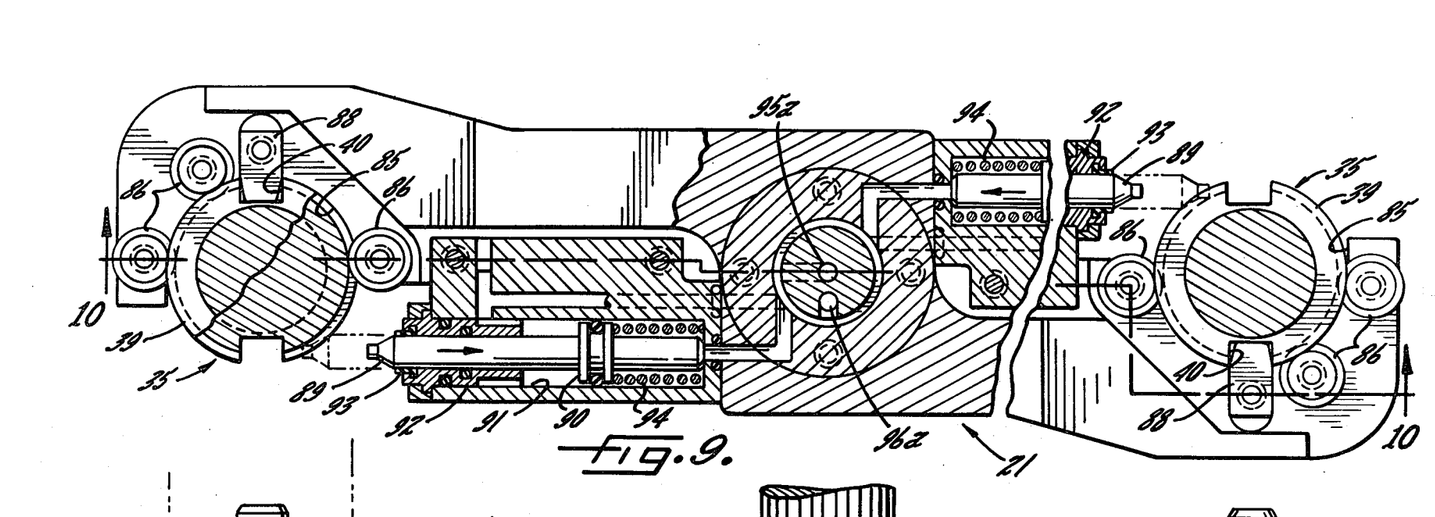
FIG. 9 is a fragmentary horizontal sectional view through the tool exchange arm taken in the plane of the line 9—9 in FIG. 2.

For the purpose of receiving tools, or more specifically, toolholders, the outer end portions of the arm 21 are formed with oppositely projecting pockets 85 (FIGS. 3 and 9). Each pocket is of generally arcuate form and is provided with three locating discs 86 situated at angularly spaced points around its periphery. The discs 86 are of tapered form and adapted to fit snugly within the peripheral groove of the toolholder gripping flange 39. The discs may be adjusted to facilitate precise engagement with the toolholder. A fixed key 88, situated adjacent the midpoint of the arcuate pocket, projects into same so as to register with a corresponding keyway 40 in the gripping flange 39 to maintain angular orientation of the toolholder. The locating discs and key are situated a small amount short of the diameter of the gripping flange 39 so as to limit the effective arc of the pocket to approximately 90% of 180 degrees, or 162 degrees. This adapts the pocket 85 to be swung into registration with the toolholder while the same is still gripped in either the power driven spindle 33 or the swing spindle 72.

Figure 8:
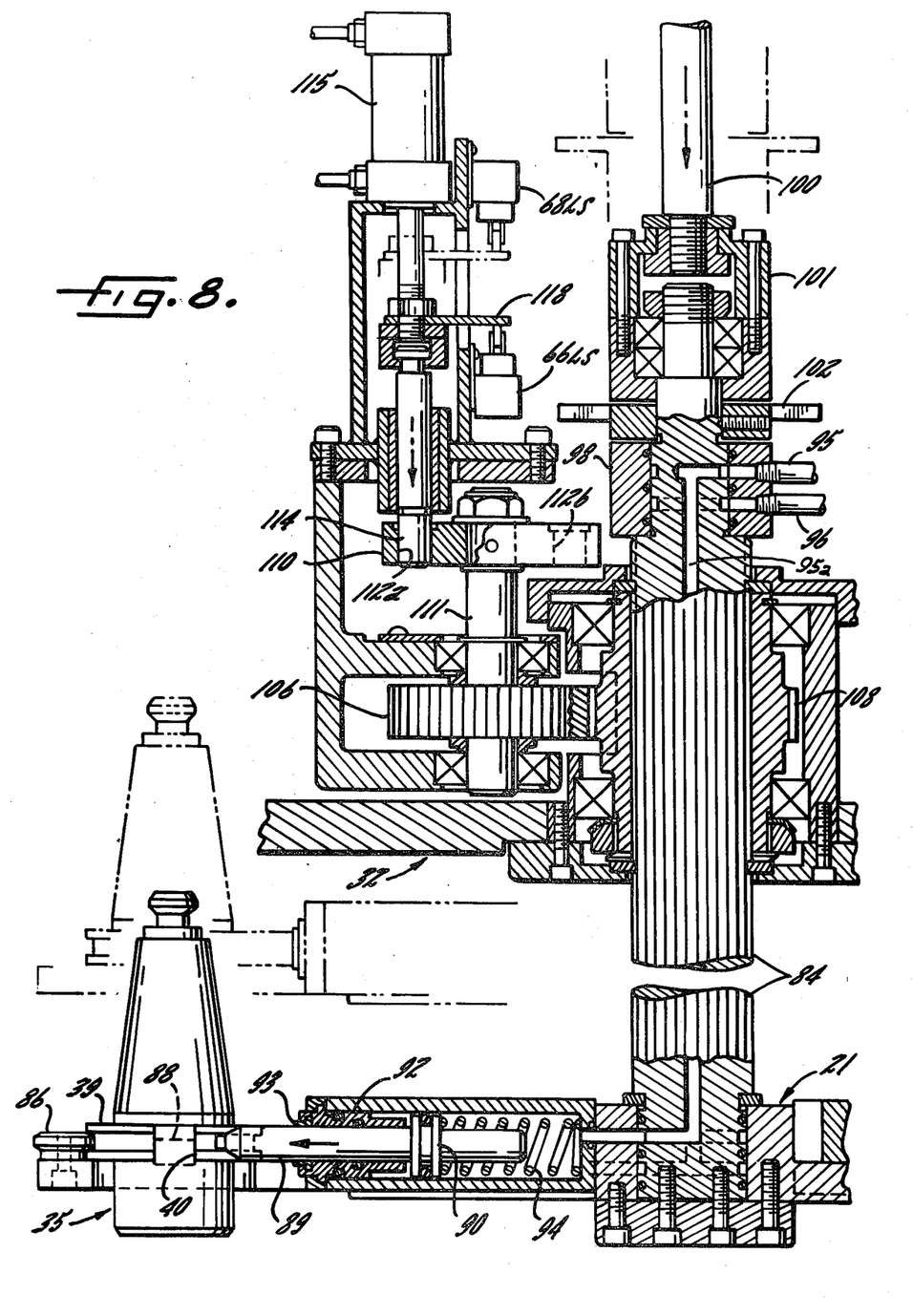
FIG. 8 is a further enlarged, fragmentary sectional view taken through the exchange arm and its supporting shaft and drive mechanism in the plane of the line 8—8 in FIG. 3.

For the purpose of positively but releasably locking the toolholder in each pocket 85, a latching plunger 89 is mounted in opposing relation to the open side of the pocket (FIGS. 3, 8 and 9). The end of the plunger 89 is suitably tapered to permit snug engagement with the groove of the gripping flange 39. The latching plunger 89 is actuated from the pressurized air control system of the machine. It is formed with a piston 90 intermediate its ends and which is adapted to slide within an actuator cylinder 91 built into the arm. At its open end, the cylinder 91 has an annular seal 92 which telescopes over the plunger 89. The seal 92 has a pair of O-rings which respectively engage the inner surface of the cylinder 91 and the peripheral surface of the plunger 89. The seal also includes an annular wiper 93 of resilient material which surrounds the projecting end portion of the plunger 89.

The plunger 89 may be released by the application of pressure fluid to one side of the piston 90 (the left side as viewed in FIGS. 8 and 9) and by exhausting pressure fluid from the opposite side. Conversely, the latch may be engaged by applying pressure fluid to the right side of the piston 90 and by exhausting it from the left side.

As a fail-safe feature, provision is made to insure that the plunger 89 will continue to retain the tool if air pressure should fail. To this end, a strong biasing spring 94 is mounted on the right-hand side of the piston (as viewed in FIGS. 8 and 9) to hold the latching plunger in engaged position.

Pressure fluid is conducted to and from the arm 21 by means of conduits 95, 96 which connect with the pressurized air control system of the machine (FIGS. 2 and 8). The conduits 95, 96 are fixed to a slip coupling 98 rotatably mounted on the shaft 84. That portion of the shaft 84 within the coupling 98 is formed with peripheral grooves communicating, respectively, with the conduits 95, 96. The peripheral grooves also communicate, via conduits 95a, 96a respectively, with the opposite ends of the latch actuating cylinders 91 on the exchange arm 21.

For moving the arm 21 axially in a direction parallel to the axis of power driven spindle 33, hydraulic actuator 99 is provided (FIG. 2). The lower end of piston rod 100 of this actuator is connected to the upper end portion of the shaft 84 by means of rotatable coupling 101. This arrangement permits the arm to be moved axially independently of its angular position. In order to relate the axial motion of the shaft 84 and arm 21 to the control system of the machine, a trip flange 102 is fixed to the shaft 84 and in this instance happens to be situated between the slip coupling 96 and the rotatable coupling 101. The trip flange 102 is thus adapted to actuate limit switches 52LS, 65LS, 67LS, and 46LS (FIG. 2). These limit switches are supported on appropriate brackets fixed to the headstock frame.

In order to rotate the arm 21 in planes perpendicular to the axis of the spindle 33, an appropriate motor 104, in this instance hydraulic, is mounted within the headstock (FIGS. 3–5) and connected to the arm support shaft 84 by means of a gear drive. The motor 104 is coupled to a drive pinion 105 which meshes with an intermediate gear 106 of somewhat larger diameter. The gear 106, in turn, drivingly meshes with a driven gear 108 integral with an internally splined sleeve which engages mating splines 109 formed in the shaft 84 (FIGS. 2 and 3). This arrangement permits the shaft 84 to slide axially within the sleeve type gear 108 while maintaining engagement with the drive train from the motor 102.

For the purpose of maintaining precise alinement between the tool holding pockets of the exchange arm 21, the power driven spindle 33 and swing spindle 72, and the toolholders to be exchanged, a precision means is provided for locating the exchange arm 21 in each of the two angular positions required for tool exchange. One such position of the arm 48 occurs when it first swings from a parked position, shown in dot-dash outline in FIG. 3, into a working position where it engages the old toolholder in the socket of power driven spindle 33 and the new toolholder in the socket of the swing spindle 72, also indicated in FIG. 3. The other angular working position occurs after these tools have been extracted axially from the spindles 33, 72, rotated through 180 degrees, and then moved axially in the reverse direction so as to insert the new tool in the power driven spindle 33 and the old tool in the swing spindle 72.

In the present instance, the precision locating means comprises a disc 110 rigidly fixed to intermediate gear 106 via a common shaft 111 (FIGS. 4–6, 8). The disc 110 is journaled on an axis laterally offset from the tool exchange arm axis and driven in timed relation therewith. Two precision locating sockets 112a, 112b spaced 180 degrees apart are formed axially in the disc. A shot pin 114 is slidably mounted in a bushing adjacent to the disc in position to enter either one of the locating sockets 112a, 112b. The gearing is such that the shot pin will register with one socket when the exchange arm 21 is in the first angular position and will register with the other socket when the arm 21 is in the second angular position described above. The shot pin 114 is shifted axially by means of hydraulic actuator 115, the piston rod 116 of which is connected to its upper end. A trip arm 118 extending outwardly from the piston rod is fixed thereto in position to actuate either one of a pair of limit switches 66LS, 68LS mounted on an adjacent bracket. When the shot pin 114 is engaged with either one of the sockets 112, 112b, the switch 66LS is tripped. When the shot pin is disengaged from the locating socket, the limit switch 68LS is tripped. The feedback from the switches 66LS, 68LS is signalled to the machine control.

Provision is made for rotating the tool exchange arm 21 rapidly into either of the two angular positions required for exchange of toolholders while avoiding sharp impacts at the extremities of such rotational movement. This is accomplished by use of a deceleration means for controlling the rotational movement of the exchange arm 21 in response to engagement between the shot pin 114 and the locating disc 110. Accordingly, a deceleration valve 119 is interposed in the hydraulic pressure fluid supply line 120 of the hydraulic motor 104 and is controlled by the locating disc 110 and shot pin 114 through a trip arm 121. The trip arm 121, like the limit switch trip arm 118, is fixed to the piston rod 116 of the actuator 115 but is disposed at 90 degrees to the trip arm 118 (FIGS. 5, 7 and 8).

Figures 5, 6, 7:
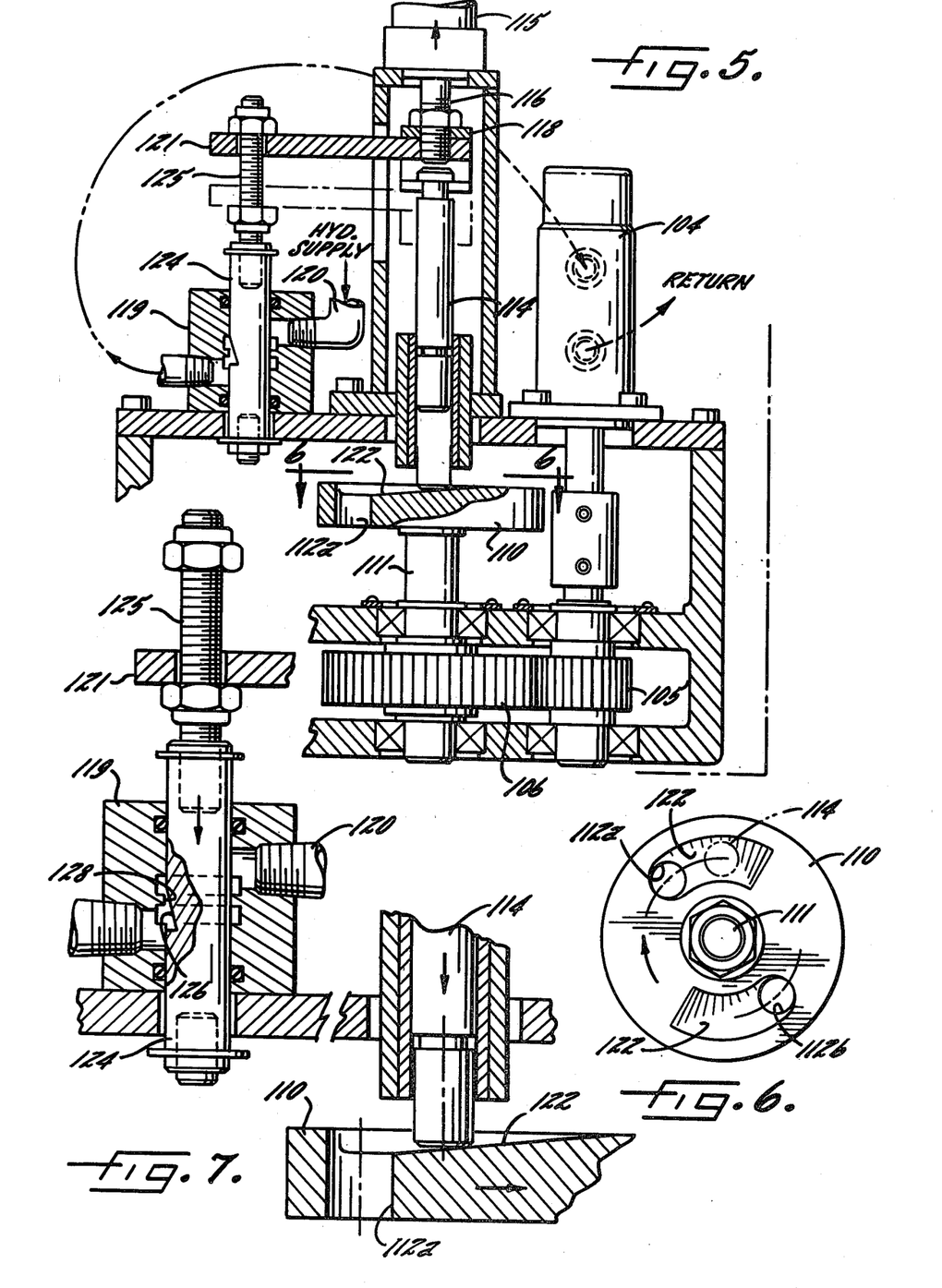
FIG. 5 is an enlarged, fragmentary vertical sectional view through the deceleration valve and shot pin mechanism, taken in the plane of the line 5—5 in FIG. 3.
FIG. 6 is an enlarged plan view of the shot pin disc, taken from the plane of the line 6—6 in FIG. 5.
FIG. 7 is a further enlarged, fragmentary vertical sectional view detailing the deceleration valve and co-acting portions of the shot pin and locating disc, taken in the plane of the lines 5—5 in FIG. 3.

The locating disc 110 is formed with an arcuate ramp or face cam 122 in its upper surface adjacent each of the sockets 112a, 112b (FIGS. 5, 6 and 7). Each ramp 122 commences at a point which in the present instance is approximately 40 degrees from its associated locating socket and becomes progressively deeper as it approaches and connects with the socket. The parts are so proportioned that, as the tool exchange arm 21 approaches within about 45 degrees of either angular tool exchange position, the actuator 115 moves the shot pin downwardly until the lower end of the shot pin is accosted by the disc area in the shallow portion of the ramp 122. At the same time, the downward movement of the shot pin 114 lowers the trip arm 121 which begins to lower spool 124 of the deceleration valve as a result of force applied through lost motion connection 125 at the upper end of the spool. The deceleration valve spool 124 is formed with a relatively large angular restrictor groove 126 which cooperates with an annular land 128 in the bore of the deceleration valve 119. When the deceleration valve plunger is in its uppermost position as shown in FIG. 5, a sufficiently large gap exists between the restrictor groove 126 and the annular land 128 to permit a substantial flow of hydraulic pressure fluid from the supply line 120 to the motor 104. As the deceleration valve spool 124 descends, the gap between the groove 126 and the land 128 becomes progressively narrower, introducing an increasing amount of restriction to the flow of hydraulic fluid as the shot pin 114 descends along the ramp 122. Such action eventually cuts off the supply of pressure fluid to the motor 104, arresting its rotation as well as the rotation of the disc 110 and the arm 21. At that point, the lower end of the shot pin 114 has reached axial alignment with one of the sockets 112a, 112b and drops into full engagement with the socket and the arm 21 has arrived at one of its two angular positions required for tool exchange, all without a perceptible impact.

OPERATION OF TOOL EXCHANGE ARM—VERTICAL MACHINE

As a starting point, it will be assumed that the machine has completed a machining cycle with the old tool (or toolholder) in the spindle 33 and the control has called for a tool change. The swing spindle 72 is fully retracted into its housing 68, as shown in solid outline in FIG. 2. The swing spindle power drawbolt is in the unclamped position. The matrix gripping fingers 62 are clamped on the toolholders 35 as shown in FIGS. 1 and 2. The following sequence of events then occurs:

(1) The tool storage matrix 45 is indexed to bring a new tool into the tool change station of the matrix.

(2) The swing spindle 72 is extended axially over the shank of the ready toolholder by pressurizing the hydraulic actuators 76. After approximately 3.43 inches of axial motion, the swing spindle power drawbolt 75 is accosted by the gripping knob 44 of the ready toolholder and hydraulic pressure is applied to engage the drawbolt 75. This causes the spindle to move forward another 0.47 inches on the tool shank.

(3) The release latch air actuator 64 is pressurized, causing the release latch 66 to move downward and open the matrix gripper fingers so as to release the toolholder 35. Such action by the actuator 64 trips the limit switch 75LS, causing the swing spindle actuators 76 and the swing spindle 72 to extend another 0.375 inches to a position in which the toolholder 35 is firmly seated in the swing spindle and the latter is ready to pivot downwardly through 90 degrees.

(4) The headstock 32 shifts from the machining position upwardly to the tool change position indicated in FIGS. 1 and 2. The machine spindle 33 is retracted to its upper limit. The exchange arm 21 is still in park position substantially parallel with one side of the headstock.

(5) The swing spindle pivot actuator 80 is actuated, causing the swing spindle 72, with the new tool, to pivot downwardly, in a plane parallel to the axis of spindle 33, through 90 degrees to the tool exchange position indicated in phantom outline in FIG. 2.

(6) The machine spindle 33 is oriented to bring a keyway on the toolholder into proper angular position to register with the key 88 in the exchange arm pocket 85.

(7) The exchange arm 21 is rotated from home or park position, counterclockwise as viewed in FIG. 3, toward the first angular working position, as shown in FIG. 3. The shot pin actuator 115 is energized, causing the shot pin 114 to move toward the locating disc 110. As the exchange arm 21 approaches toward the machine spindle 33 and the swing spindle 72, the shot pin engages the ramp 122 of the disc 110. As the disc rotates beneath it, the shot pin moves down the ramp 122 causing the deceleration valve spool 124 to descend. This slows the rotational movement of the arm 21 and ultimately arrests such movement without perceptible impact, at which time the shot pin engages the locating socket 112a and the arm pockets 85 have registered with the toolholders 35 in the spindle 33 and swing spindle 72.

(8) The limit switch 65LS is tripped, resulting in application of clamping pressure to the exchange arm latching plungers 89 to secure the toolholders in the arm 21. The matrix 45 then moves to bring the support bracket for the old tool into the ready station.

(9) The power drawbolt 37 of machine spindle 33 is released by rotating its Acme nut to release the old toolholder in the spindle 33. The power drawbolt 75 of the swing spindle 72 is actuated to release the new toolholder in the swing spindle. The actuator 99 is energized to move the arm support shaft axially outward, extending the tool exchange arm 21 axially outward to clear the toolholders away from the spindles 33, 72 and tripping the limit switch 46LS.

(10) The actuator 115 is operated to retract the shot pin 114 from the disc socket 122a. The exchange arm 21 rotates counterclockwise, as viewed in FIG. 3, through an angle of 180 degrees toward its second angular working position. When the arm 21 is about 45 degrees from the second angular working position the shot pin actuator 115 is energized to extend the shot pin 114 into contact with the locating disc 110. As the arm 21 approaches the second working position, the shot pin 114 moves down the ramp 122 on the disc 110 causing the deceleration valve spool 124 to slow and then arrest arm rotation without perceptible impact. The shot pin 114 drops into the locating socket 112b.

(11) The arm extension actuator 99 is energized to move the exchange arm 21 axially toward the headstock, inserting the new toolholder in the socket of machine spindle 33 and the old toolholder in the socket of swing spingle 72. The power drawbolts 37 and 75 of the machine spindle 33 and swing spindle 72, respectively, engage the tools. The latching plungers 89 of the exchange arm 21 are unclamped; the shot pin 114 is retracted from the locating socket 122b; and the arm 21 then swings in a clockwise direction to its home or park position illustrated in FIG. 3.

(12) The swing spindle 72 is rotated upward through 90 degrees and returns the old toolholder to the matrix.

It will be appreciated that the movements described in the foregoing operating sequence have been effected by the control system of the machine 20. The present invention is not concerned with the details of the control system per se, the latter being of a conventional nature.

HORIZONTAL SPINDLE EMBODIMENT

Figure 11:
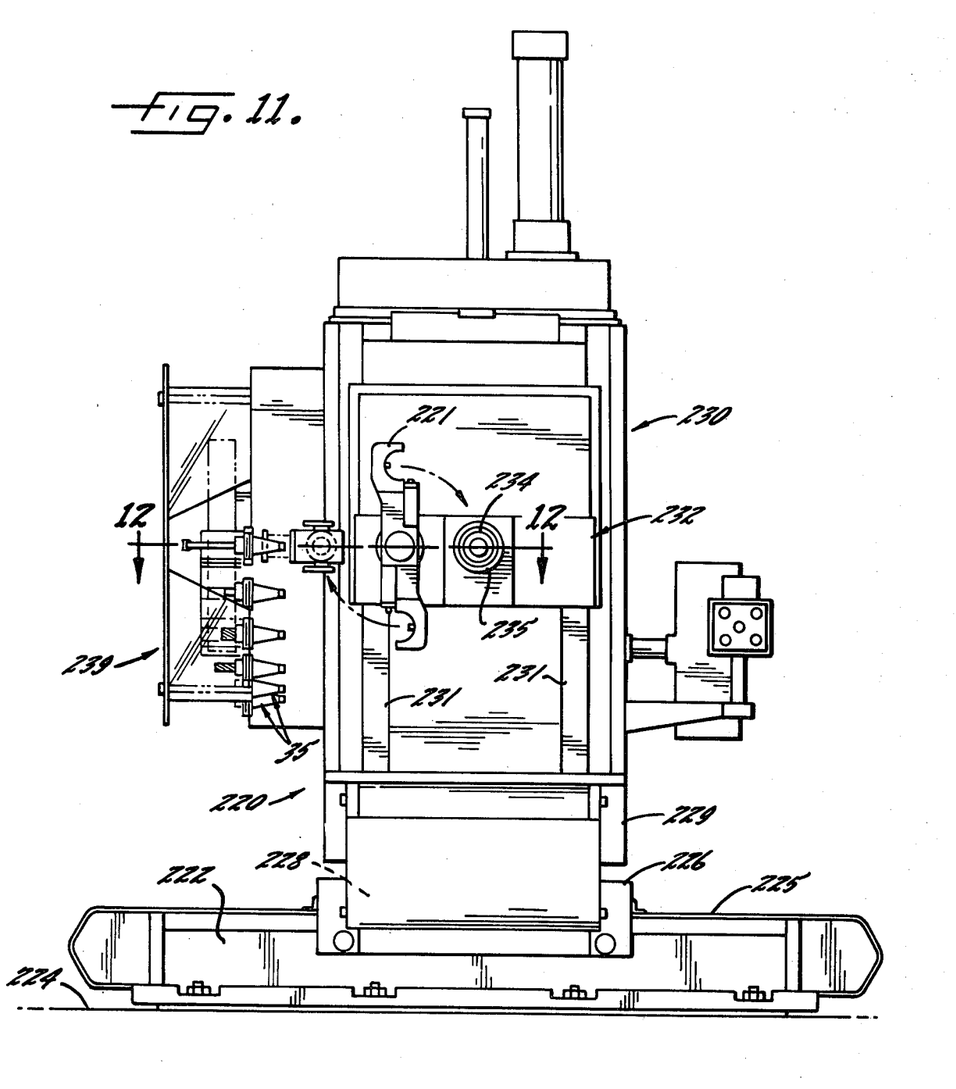
FIG. 11 is a front elevational view of an illustrative horizontal spindle machining center having a tool exchange arm also exemplifying the present invention.
Figure 12:
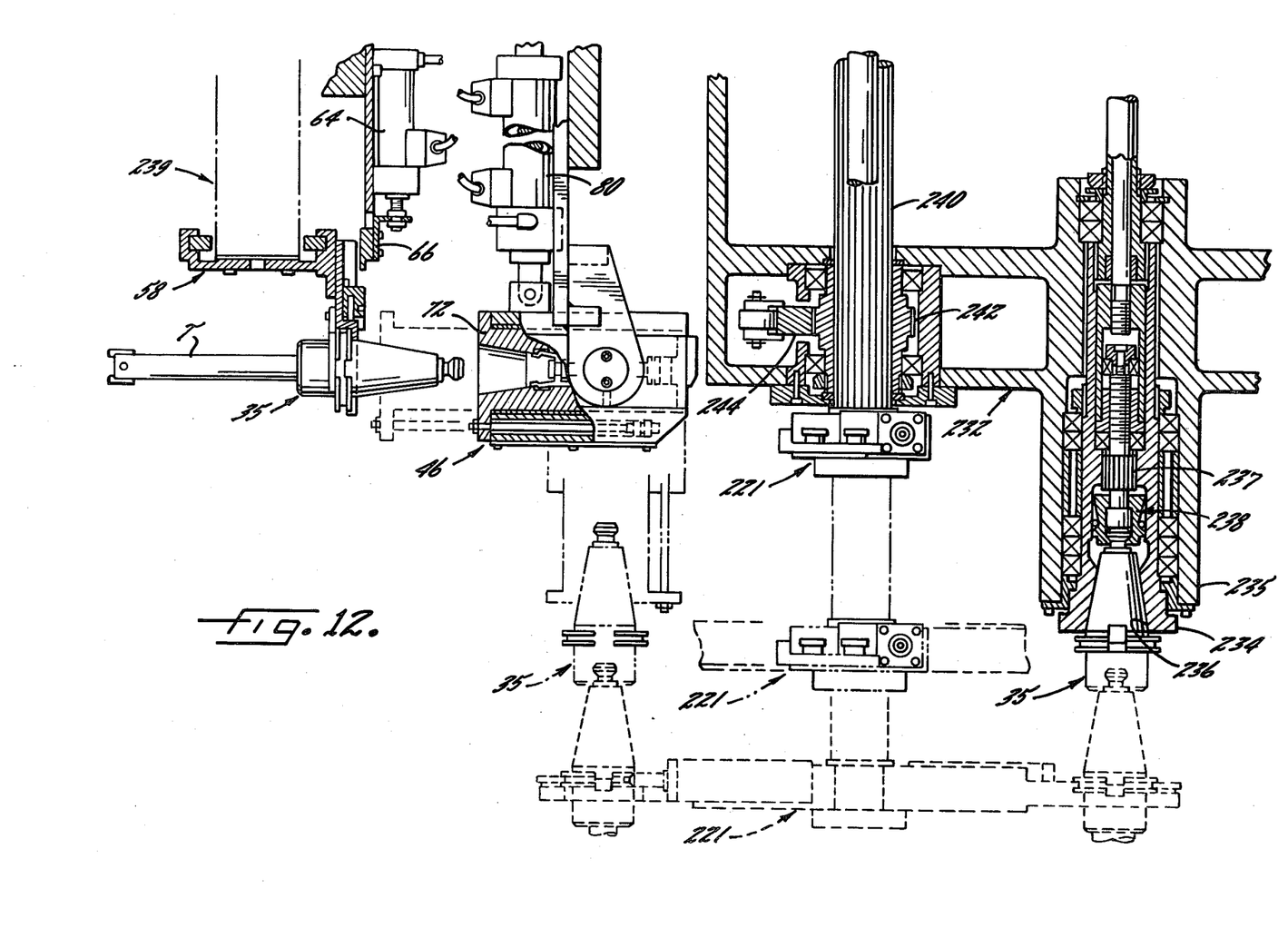
FIG. 12 is an enlarged, fragmentary horizontal sectional view taken through the axes of the power driven machining spindle, the exchange arm, and the swing spindle in the plane of the line 12—12 of FIG. 11.

Turning next to FIGS. 11 and 12, there is shown an illustrative horizontal spindle machining center 220 in which the present invention is also exemplified. The machine 220 is a multi-function machining center which incorporates an automatic tool changer with a tool exchange arm 221. The tool changer of the machine 220 is similar to the tool changer of the vertical machine 20 described above except for certain changes required to accommodate the horizontal spindle.

The machining center 220 (FIG. 11) comprises a base 222 supported on an appropriate foundation 224 and having longitudinally extending ways (not shown) on its top side hidden by movable way covers 225. A saddle 226 is slidably supported on the longitudinal ways of the base and, in turn, is provided with ways 228 (under cover) on its top side extending transversely of the ways on the base. A cross slide or column base 229 is slidably supported on the saddle ways 228. An upstanding column 230 is mounted on the cross slide 228 and is formed with vertical ways 231 which slidably support a vertically translatable headstock 232. The headstock carries a horizontal tool spindle 234 supported in the usual manner on antifriction bearings situated in an outwardly projecting extension 235 of the headstock frame (FIG. 12). The machine spindle is formed with a tapered socket 236 for receiving a commercial toolholder 35 identical to the toolholder previously described. It also contains a hydraulically actuated power drawbolt 237 with a drawfinger system 238 adapted to engage the tapered knob 44 on the inner end of the toolholder shank. The drawbolt 238 and drawfinger system are substantially identical to those which have been described earlier in connection with the vertical spindle machine 20.

The machine 220 further includes a tool storage matrix 239 mounted in outwardly spaced relation on the column 230 by means of a suitable support bracket. The matrix 239 is generally similar to the tool storage matrix 45 of the machine 20 except for the fact that the tool ready station is located at the front of the machine in a position displaced 90 degrees above the ready station of the vertical machine 20.

The tool changer includes tool exchange arm 221 of the two-handed type, the tool engaging components of which are substantially identical with those of the exchange arm 21 (FIGS. 11 and 12). The arm 221 is supported by a splined shaft 240 extending from the front face of the headstock 232 in parallel alinement with the machine spindle 234. The shaft 240 and arm 221 are axially extensible to a tool pick-up position, and further to a tool exchange position. The shaft 240 and arm 221 are angularly indexable through 180 degrees for tool pick-up and exchange, and also indexable through 90 degrees to a vertical or park position. The exchange arm 221 has keyed tool receiving pockets and associated power actuated latching plungers 125 substantially identical in construction and operation to those of the tool exchange arm 21 described above. The exchange arm 221 is movable axially in a direction parallel to the axis of the machien spindle 234. The arm 221 is also disposed for rotation in planes perpendicular to the machine spindle axis.

The automatic tool changer of the machine 220 includes swing spindle assembly 46 (FIGS. 11 and 12) which is interposed between the tool storage matrix 239 and the two handed tool exchange arm 221 for the purpose of transferring tools therebetween. The assembly 46 of tool changer in the machine 220 is substantially identical in structure and operation to the swing spindle assembly 46 of the vertical machine, the principal difference being that the assembly 46 and its swing spindle 72 associated with the horizontal machine 220 are disposed to swing in a horizontal plane instead of a vertical plane. The horizontal plane in this instance is also parallel to the axis of the machine spindle 234 and is identified by the line 12—12 in FIG. 11. As in the case of the vertical machine, the assembly 46 in the horizontal machine is supported from the matrix support bracket.

For the purpose of axially extending and for indexing the exchange arm 221 in the horizontal machining center 220, resort is had to the actuating mechanisms described in James Nelson application Ser. No. 142,625, supra, in connection with the horizontal spindle embodiment. One such mechanism comprises a pair of hydraulic actuators, one of which functions to extend the exchange arm shaft 240 and the arm 221 from their parked position to a tool pick-up position for engaging tool holders in the power driven machine spindle 234 and in the associated swing spindle 72. The other hydraulic actuator functions to axially position the exchange arm to extract and replace toolholders in the machine spindle 234 and in the swing spindle 72.

The other mechanism is adapted to index or rotate the exchange arm 221. The indexing mechanism is adapted to rotate the arm 221 through 90 degrees for parking and through 180 degrees for tool exchange. It comprises a pinion 241 integral with the splined hub 242 on the exchange arm shaft 240, driven by a meshing rack 244. First and second hydraulic actuators are operated selectively to position the rack 244, and thus index the exchange arm 221.

The operation of the tool changer and exchange arm 221 is closely similar to that of the tool changer and exchange arm 21 described earlier, with very minor differences. The tool change position of the headstock 232, for example, is in horizontal alignment with the swing spindle assembly 46 and the ready station at the front of the matrix, as shown in FIG. 11. In addition, the tool exchange arm 221 has a further increment of axial motion compared to that of the tool exchange arm 21. As indicated in FIG. 12, this is due to the fact that the headstock housing includes the relatively long spindle extension 235. The arm 221 must travel beyond the end of the extension 235 before it can engage and exchange tools.

I claim as my invention:

1. In a machining center which includes a headstock, a power spindle, and an automatic tool changer, the combination comprising:
    (a) a tool exchange arm;
    (b) a support shaft fixed to said exchange arm and extending normally thereof, said shaft being mounted in said headstock for rotational and axial movement relative thereto;
    (c) power means for rotating said arm in planes normal to the axis of said shaft;
    (d) a locating disc driven in timed relation with said power means and journaled on an axis laterally offset from that of said tool exchange arm;
    (e) means defining a pair of positioning sockets in said locating disc corresponding respectively to two spaced apart rotational positions of said arm;
    (f) a shot pin slidably mounted in said headstock and adapted to engage an alined one of said positioning sockets;
    (g) deceleration valve means connected with said power means and adapted to decelerate said exchange arm as a disc positioning socket approaches alinement with said shot pin; and
    (h) means connecting said shot pin with said deceleration valve means for actuation of the latter by said shot pin;
    (i) means on said locating disc engageable by said shot pin for actuating said deceleration valve means as a disc positioning socket approaches alinement with said shot pin.

2. The combination set forth in claim 1, wherein said means on said locating disc are face cams.

3. The combination set forth in claim 1, wherein said means on said locating disc are ramps extending arcuately of the face of said disc adjacent said shot pin and deepening progressively as said ramps merge with respective ones of said disc sockets.

4. In a machining center which includes a headstock, a power spindle, and an automatic tool changer, the combination comprising:
    (a) a two handed tool exchange arm indexable to two predetermined angular positions;
    (b) a support shaft fixed to said exchange arm and extending normally thereof, said shaft being mounted in said headstock for rotational and axial movement relative thereto;
    (c) fluid power means for rotating said arm between said predetermined angular positions in planes normal to the axis of said shaft;
    (d) a locating disc driven in timed relation with said fluid power means;
    (e) means defining a pair of positioning sockets in said locating disc corresponding respectively to two spaced apart rotational positions of said arm;
    (f) a shot pin slidably mounted in said headstock and adapted to engage an alined one of said positioning sockets;
    (g) deceleration valve means interposed in the pressure fluid supply to said fluid power means and adapted to decelerate said exchanger arm as said arm approaches one said predetermined angular position and said disc positioning socket approaches alinement with said shot pin; and
    (h) means connecting said shot pin with said deceleration valve means for actuation of the latter by said shot pin;
    (i) cam means on said locating disc engageable by said shot pin for actuating said deceleration valve means as a disc positioning socket approaches alinement with said shot pin.

5. The combination defined in claim 4, wherein said means connecting said shot pin with said deceleration valve means is a lost motion connection; and said deceleration valve means when fully actuated by said shot pin arrests the rotational motion of said tool exchange arm and said locating disc without perceptible impact and permits said shot pin to enter one said positioning socket.

6. The combination set forth in claim 4, wherein said deceleration means comprises:
    (i) a valve body having a bore therein;
    (j) a valve spool movable axially of said bore in response to movement of said shot pin;
    (k) means defining fluid entry posts at axially spaced points in said valve bore;
    (l) a land defined in said bore between said ports and having a relatively close sliding fit with said valve spool;
    (m) and means defining a restrictor groove on said valve spool adapted to meter the flow of pressure fluid past said land.

7. The combination defined in claim 6, wherein said deceleration valve spool restrictor groove is angularly disposed relative to said valve bore.

8. The combination defined in claim 7, wherein said deceleration valve spool is adapted to meter the flow of pressure fluid past said land in proportion to the axial position of said plunger relative to said land.

9. In a machining center which includes a headstock, a power spindle, and an automatic tool changer including a swing spindle, the combination comprising:
    (a) a support shaft mounted on said headstock for axial movement parallel to the spindle axis and rotational movement in planes perpendicular to said spindle axis;
    (b) a two handed tool exchange arm fixed in normal relation to said support shaft;
    (c) means defining a pair of oppositely facing toolholder engaging pockets on said exchange arm adjacent the ends thereof, said exchange arm being adapted to exchange toolholders between said swing spindle and the power driven spindle of said headstock;
    (d) a latching plunger on said exchange arm adjacent each said pocket for releasably retaining a toolholder therein, said latching plunger being aligned generally with a radius from the axis of said exchange arm to the center of said pocket but offset outwardly relative to said pocket;

(e) a piston fixed to each said latching plunger;

(f) means defining in said exchange arm an actuator cylinder housing each said latching plunger and its piston; and (g) a seal at the open end of each said actuator having sealing engagement with said cylinder and said plunger.

10. The combination set forth in claim 9, wherein the outer end of said latching plunger is tapered for engagement with a grooved flange on the toolholder.

11. The combination set forth in claim 9, wherein said seal includes at its outer end an annular wiper of resilient material disposed in engagement with said latching plunger.

12. The combination set forth in claim 9, wherein a fail safe spring is interposed between each said piston and the inner end of its associated cylinder.

13. The combination set forth in claim 9, wherein said latching plungers are actuated by pressurized air.

14. The combination set forth in claim 13, wherein said exchange arm support shaft and said arm include supply and relief conduits for conducting pressurized air to and from said actuating cylinders on said arm.

* * * * *